Figure 1:
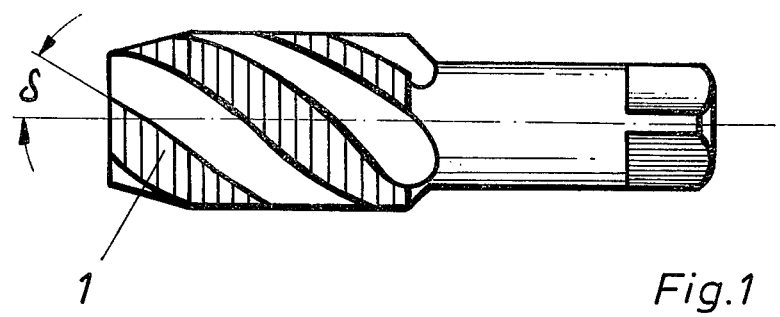

United States Patent [19]

Marburger

[11] Patent Number: 4,462,727
[45] Date of Patent: Jul. 31, 1984

[54] FLUTED TAP
[75] Inventor: Fritz Marburger, Frankfurt am Main, Fed. Rep. of Germany
[73] Assignee: Günther & Co.
[21] Appl. No.: 308,050
[22] Filed: Oct. 2, 1981
[30] Foreign Application Priority Data
  Oct. 4, 1980 [DE] Fed. Rep. of Germany ....... 3037568
[51] Int. Cl.³ .............................................. B23G 5/06
[52] U.S. Cl. ................... 408/220; 10/141 R; 408/230
[58] Field of Search ...................... 10/111, 140, 141 R, 10/152 T; 408/215, 217, 218, 219, 220, 226, 227, 228, 229, 230, 222; 76/101 B

[56] References Cited
U.S. PATENT DOCUMENTS

| 194,469 | 8/1887 | Schaub | 10/141 R |
| 250,728 | 12/1881 | Harvey | 408/220 |
| 1,309,232 | 7/1919 | Ahond | 408/220 |
| 1,365,338 | 1/1921 | Muth | 408/222 |
| 1,408,205 | 2/1922 | Jfanger | 10/141 R |
| 1,953,528 | 4/1934 | Bysshe et al. | 408/218 |
| 1,958,105 | 5/1934 | Koehler | 76/101 B |
| 2,816,302 | 12/1957 | Bauer | 408/220 X |

FOREIGN PATENT DOCUMENTS

| 210236 | 7/1960 | Austria | 10/152 T |
| 422552 | 9/1974 | U.S.S.R. | 10/141 R |
| 552155 | 3/1977 | U.S.S.R. | 10/141 R |

Primary Examiner—E. Michael Combs
Attorney, Agent, or Firm—Toren, McGeady and Stanger

[57] ABSTRACT

A fluted screw tap has a plurality of thread lands each with a pair of outwardly facing flanks. Each flank of a pair has a different asymmetric relief ground flank surface extending in a spiral form along the length of the thread land. Each thread land has a corner resting against the cut thread. Each of the flank surfaces in a pair has a different relief grinding angle extending along the threaded flank and the angle approaches the zero value at the end of the thread land where the corner resting against the cut thread is located.

4 Claims, 6 Drawing Figures

FLUTED TAP

The invention refers to a fluted screw tap having thread lands exhibiting relief-flanks.

The relief-grinding of the tooth or thread lands of screw taps prevents "seizing" of the tool in the case of wear starting and thereby increases the working life. Whilst in the case of screw taps the tooth lands of which are relief-ground, the flanks of the tooth lands come into contact across their whole area with the thread which has already been cut, the relief-grinding leads to only the edges of the tooth lands at the side of the groove in the cutting direction still resting against the cut thread. The guidance characteristics of the thread thereby get impaired and the danger is increased of a miscut. Thus the correct degree of the relief-grinding always forms a compromise.

In particular in the case of screw taps having grooves running in the shape of a spiral this problem is strongly marked, since in this case an axial component of force determined by the angle $\delta$ of the spiral becomes effective during the cutting. Whilst this component of force in the case of screw taps which are not relief-ground gets taken up by the flank faces at the front in the cutting direction against the cut thread, in the case relief-ground screw taps this happens as described only at individual edges.

The relief-grinding of the tooth lands is now usually done in such a way that a circular grinding wheel bevelled at its circumference to correspond with the required flank angles $\alpha$ or $\alpha'$ can engage in the thread lands, whilst the screw tap blank is turned in the usual way about the axis of its thread and correspondingly displaced. If the rotating grinding wheel now makes as a whole a relative motion at an angle of almost exactly 90° towards the axis of the screw tap blank, this leads to thread lands which become continuously deeper.

The aforesaid relative motion is now executed in such a way that the rotating grinding wheel at the instant of its engagement with the one edge of a thread land next a groove is lying exactly in the correct position for the dimensioning of the intended thread, whilst upon turning the screw tap blank onwards as far as the other edge of the respective thread land next a groove it gets brought up to the axis of the screw tap. Until engagement in the next thread land the grinding wheel is then carried back again to the required original value.

Whilst an area of development concentric with the axis of the screw tap, of a thread land which is not relief-ground, exhibits between two grooves the shape of a parallelogram which is bounded at one side by the helical lines and at the other side by the edges of the grooves, in the case of relief-ground screw taps the corresponding areas have the shape of a trapezium. The parallel sides of it are moreover bounded by the grooves, whilst the parallel helical lines are still touched by the area only at the one side of the groove and the non-parallel sides of the area deviate from adjacent helical lines by respectively the same angular amounts $\beta_1$ and $\beta_2$. Thus the aforesaid areas are in the case of relief-ground screw taps smaller than in the case of those not relief-ground and the screw tap still comes into contact with the already cut thread only at the side of the groove at which the corners of the aforesaid areas touch the helical lines.

The problem underlying the invention is to create a screw tap in which the guidance characteristics are as far as possible as good as in the case of a screw tap which is not relief-ground, that is, in which as a rule miscuts cannot happen, and which on the other hand, however, has the advantages of relief-ground screw taps. The problem furthermore consists in proposing a method of production of such screw taps. The problem is solved in the way that in the case of a screw tap of the kind mentioned initially, in accordance with the invention adjacent flanks of the thread lands are relief-ground by different amounts. Accordingly the flank which is less relief-ground has above all, if the relief-grinding is not far too large, an almost exactly as good a guidance characteristic as a flank which is not relief-ground, whilst the adjacent flank which is relief-ground more strongly in relation to the first flank, looks after a particularly good free-cutting, since here the angle of relief-grind is comparatively large, which largely avoids seizing of the tool in the case of wear starting.

The flanks of the thread lands pointing away from the direction of tapping may be relief-ground more heavily than the flanks pointing in the direction of tapping, if the delivery of the chips is provided for against the direction of tapping. This solution is of particular advantage in the case of spirally grooved screw taps, since the component of force in the direction of the axis of the thread, caused by the spiral angle $\delta$ as already described, now no longer gets transmitted exactly at one point by the less relief-ground flank of the respective thread land, but corresponding with the trend of the apex of the angle of relief-grind, gets distributed over a certain range of the flank. Thus such a solution is to be recommended in the case of screw taps for righthand threads which have a righthand twist and those for lefthand threads which have a lefthand twist. But there are also twisted screw taps which deliver the chips in the direction of tapping, that is, forwards. In this case screw taps for righthand threads have a lefthand twist and for lefthand threads have a righthand twist. In the case of these screw taps, in accordance with the invention the flanks pointing in the direction of tapping are then more heavily relief-ground.

It has turned out that screw taps in accordance with the invention exhibit the best characteristics if in each case only one of the adjacent flanks is relief-ground, whilst the other corresponds with the helical line along its whole length. Depending upon the application either the flank pointing in the direction of tapping or the flank pointing away from it may be relief-ground.

The screw tap in accordance with the invention is advantageously produced in such a way that a circular grinding wheel bevelled at its circumference to correspond with the flank angles $\alpha$ and $\alpha'$ moves in each case by a fixed amount up towards the axis of the tap and in doing so the tap through turning about its axis gets turned further by the amount of one land length, but in doing so the angle $\gamma$ between the direction of motion of the grinding wheel (relative motion) and the axis of the tap deviates by more than about 1° from 90°. Thus in the case of the relative motion of the grinding wheel with respect to the perpendicular to the axis of the tap it is a question of a forwards and sideways motion, whilst according to the state of the art only a forwards motion is known. The return of this oscillating motion of the grinding wheel is effected while passing across the groove.

Since the flanks of the thread lands of screw taps for asymmetrical threads must have different slopes accordingly even in the case of respectively adjacent flanks, the grinding wheel may be bevelled at its circumference to correspond with the corresponding flank angles α and α' by different amounts at the two sides.

The forwards and sideways motion of the grinding wheel may now amount to (90°+α) to (90°−α') or vice versa—that is, (90°+α') to (90°−α); that is, in the case of screw taps for symmetrical threads to correspond with (90°+α) to (90°−α). The sideways component of the motion of the grinding wheel may moreover be effective while running in the same direction or in the opposite direction to the feed corresponding with the pitch, of the axis of the screw tap during the relief-grinding, depending upon whether the flank pointing in the direction of tapping or the flank pointing away from it is to be more heavily relief-ground than the adjacent one. The maximum amount of the sideways motion of the grinding wheel with respect to the perpendicular to the axis of the screw tap is in any case to be dimensioned in such a way that in this case one of two adjacent flanks is still relief-ground, whilst the other corresponds along its whole length with the appropriate helical line.

Finally it may be of particular advantage if the motion of relief-grinding (relative motion) is effected along a curved line.

Figure 2:
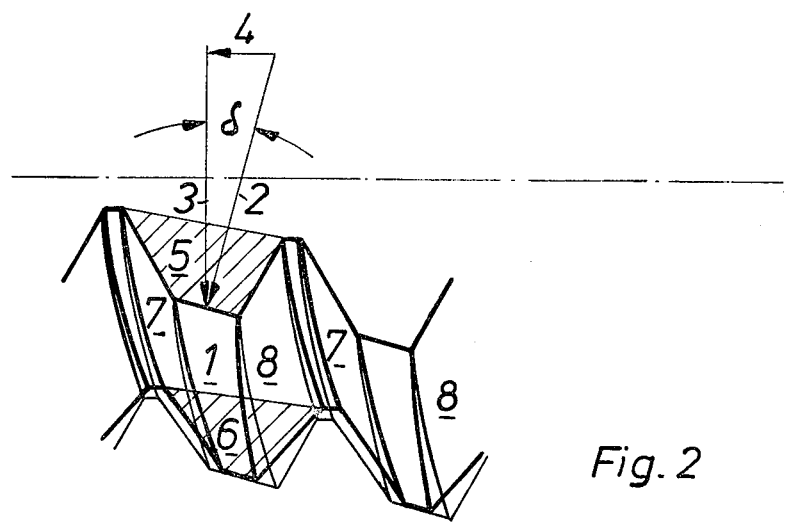
Figures 3A, 3B, 3C:
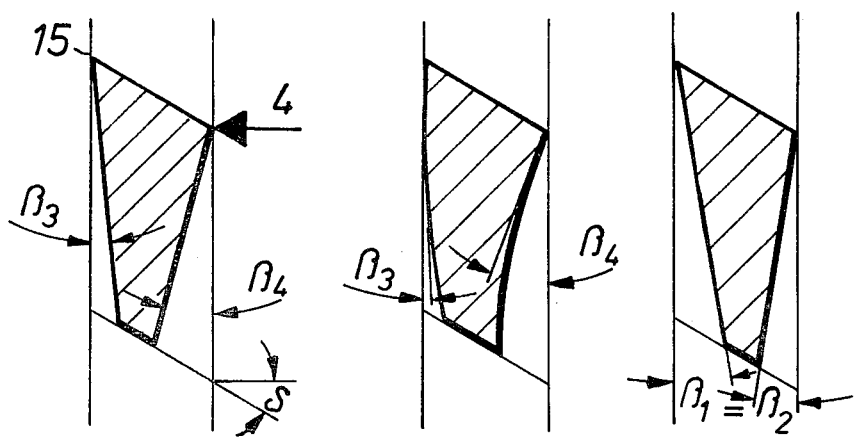
Figure 4:
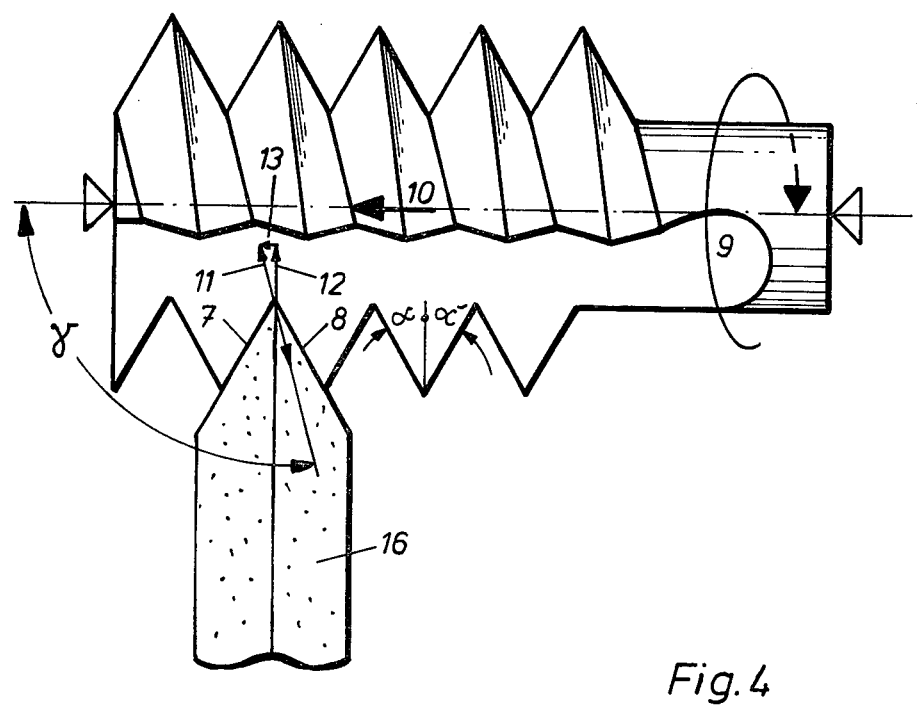

The invention is described in greater detail below with the aid of embodiments illustrated in the drawings. There is shown in:

FIG. 1—a spirally grooved screw tap for a righthand thread;

FIG. 2—a perspective partial elevation of a screw tap as in FIG. 1;

FIGS. 3a to 3c—concentric areas of development of screw taps relief-ground in different ways for one thread land in each case; and FIG. 4—a partial longitudinal section of a righthand screw tap blank through its axial plane and the diameter of the grinding wheel.

In FIGS. 1 and 2 the grooves are inclined spirally with respect to the axis of the screw tap by the amount of the angle δ. In the region of its tip the screw tap is particularly sharply tapered and the flanks 7 and 8 of the individual thread lands do not run sharply together, but are separated from one another by faces 1 which arise through the grinding to a taper and are largest at the tip of the screw tap. Each thread land exhibits sidefaces 5 and 6 at the side of the grooves. Moreover in the case of relief-ground screw taps only the one of these two sidefaces (here 5) corresponds with the required thread, whilst the opposite one (here 6), caused by the relief-grind, is smaller. In FIG. 2 the lines pointing outwards with respect to the thread lands—with the faces 1, 5, 6, 7 and 8—reproduce the outer boundary lines before the relief grinding. It furthermore becomes clear from that, that the flanks 8 are here more heavily relief-ground that the flanks 7.

It is only against the sideface 5 which exhibits the total area and lies in the direction of the later cutting motion that during the cutting of the thread the force 2 engages, which arises through the removal of the material which is to be tapped out. This force has an axial component 4 and a radial component 3. The axial component 4 generates a contact pressure of the flank 7 or respectively of its front edge with the sideface 5 against the cut thread. With sharp screw taps and materials that are easily cut away, miscuts may occur in this case.

If one takes a section through a thread land which is running concentrically with the axis of the screw tap, this area as described above is in the case of a screw tap which is not relief-ground, a parallelogram in which the lines of section through the flanks correspond with the helical lines of the thread and the lines of section through the sidefaces of the lands correspond with the grooves. Such a cross-section is trapezoidal in the case of screw taps which are relief-ground, in which case these lines of section converge to correspond with the relief-grind of the flanks 7 and 8 and respectively include with the associated helical lines equal angles $\beta_{1,2}$ of relief-grind, if it is a question of the hitherto known relief-ground screw tap as illustrated in FIG. 3c.

In the case of screw taps in accordance with the invention the angles of relief-grind, as appears from FIGS. 3a and 3b, are unequal, i.e., one of these two angles is considerably smaller than the hitherto known angles $\beta_{1,2}$ of relief-grind. Certainly in this case too only one corner 15 rests against the cut thread, but the helical line and the line of section of the flank run so slowly apart that the force engaging at the point 15 is distributed along a moreorless large range of the flank in question, that is, in particular when care is taken through an appropriate relief-grind that the angle $\beta_3$ of relief-grind in the direction towards the point of contact 15 gradually approaches the value 0, that is, it changes along the thread land. The one of the two angles of relief-grind may also amount to 0° so that the whole flank area rests against the cut thread.

In the production of a screw tap in accordance with the invention in accordance with FIG. 4 the screw tap blank gets turned about its axis in the direction 9 and moved forwards in the direction 10. In doing so the rotating circular grinding wheel 16 bevelled at its circumference to correspond with the flank angles α and α' respectively, engages between the flanks 7, 8 of the thread lands. At the start of each individual grinding process the grinding wheel is lying in such a position (FIG. 4) that the grinding leads to shaping to correspond with the required thread. Upon turning the blank further in the direction 9 by the amount of one land length the grinding wheel now gets moved as a whole relatively to the screw tap blank, e.g., forwards in the direction 12, i.e., radially to the blank, and sideways in the direction 13, i.e., axially to the blank. Thus as a whole the grinding wheel 16 executes a motion relative to the axis of the screw tap blank in the direction 11. A relief-grind is thereby generated which becomes increasingly deeper along the length of the individual land. Whilst the blank gets turned onwards by the amount of the width of the groove, the grinding wheel travels back into the required starting position; at the next land the "oscillating" grinding process starts afresh. During this forwards and sideways motion or a motion of the grinding wheel as a whole, which runs immediately in the resulting direction 11, independently of the direction of the axis of rotation of the grinding wheel with respect to the axis of the screw tap, an angle γ arises between the axis of the screw tap blank and the resulting direction in which the grinding wheel as a whole is moved. This angle γ may in the extreme case amount to 90°±α or 90°±α' respectively. In these extreme cases one of the two flanks does not get ground at all but only the flanks adjacent to it in each case.

The relative motion of the grinding wheel may also run forwards with respect to the axis of the screw tap blank in such a way that the angle γ at the start of the grinding of one thread land has the maximum value and then gradually approaches a value of about 90°. The peak forces against the front edge of the flank resting against the cut thread are thereby reduced and distributed over a larger area of the flank.

What is claimed is:

1. A fluted screw tap comprising a plurality of thread lands (1), each said thread land having a pair of outwardly facing flanks (7, 8), wherein the improvement comprises that in each said pair of flanks each flank has a different relief ground flank surface, said flank surfaces on each said thread flank are asymmetrically relief-ground and extend in a spiral form over the length of said thread land, each said thread land has a corner (15) which rests against the cut thread, each said flank surface has a relief grinding angle extending along said thread flank gradually approaching the value zero at the end of said thread land at which said corner (15) is located, and the relief grinding angle of each said flank is different from the relief grinding angle of the other said flank of each said thread land.

2. A fluted screw tap as set forth in claim 1, characterized in that said screw tap having a leading end and a trailing end in the drilling direction, said screw tap arranged for the delivery of chips in the direction from the leading end toward the trailing end, said thread lands having first said flanks 8 facing toward the trailing end and second said flanks 7 facing toward the leading end and said first flanks are relief-ground to a greater amount than said second flanks.

3. A fluted screw tap, as set forth in claim 1, wherein said screw tap having a leading end and a trailing end in the drilling direction and said screw tap arranged for the delivery of the chips toward the leading end, and said thread lands each having a first said flank 8 facing toward the trailing end and a second said flank 7 facing toward the leading end and said second flanks are relief-ground to a greater amount than said first flanks.

4. A fluted screw tap, as set forth in claim 2, 3 or 1 wherein only one of said adjacent flanks is relief-ground.

* * * * *